United States Patent [19]
Inouye

[11] 3,984,706
[45] Oct. 5, 1976

[54] ELECTROMAGNETIC ACTUATOR FOR VOICE COIL

[75] Inventor: Yuji Inouye, Musashino, Japan

[73] Assignee: Fujitsu Ltd., Japan

[22] Filed: Nov. 25, 1974

[21] Appl. No.: 526,898

Related U.S. Application Data

[63] Continuation-in-part of Ser. No. 316,978, Dec. 20, 1972, abandoned.

[30] Foreign Application Priority Data

Dec. 27, 1971  Japan.............................. 46-105315

[52] U.S. Cl.................................... 310/12; 310/14; 310/154
[51] Int. Cl.²........................................ H01L 41/02
[58] Field of Search............................... 310/12–14, 310/27, 216–218, 154

[56] References Cited
UNITED STATES PATENTS

| | | |
|---|---|---|
| 2,906,899 | 9/1959 | Geneslay.............................. 310/13 |
| 3,296,471 | 1/1967 | Cochardt............................. 310/154 |
| 3,376,578 | 4/1968 | Sawyer................................. 310/13 |
| 3,502,918 | 3/1970 | Done et al. .......................... 310/77 |
| 3,828,213 | 8/1974 | Yamashita et al. ............. 310/154 X |
| 3,836,801 | 9/1974 | Yamashita et al. ................. 310/154 |

*Primary Examiner*—Mark O. Budd
*Attorney, Agent, or Firm*—Maleson, Kimmelman & Ratner

[57] ABSTRACT

An electromagnetic actuator for linear driving of movable heads of a magnetic disc unit in an information processing system. A plurality of slits or plates are provided with a magnetic pole inscribed directly on the internal surface of a permanent magnet, and increase magnetic reluctance of the magnetic path and reduce inductance of a moving coil, thus providing shorter positioning time and stable control. In order to obtain the constant strength of magnetic flux and/or torque of a moving coil, said slits or plates have a particular structure.

6 Claims, 20 Drawing Figures

ELECTROMAGNETIC ACTUATOR FOR VOICE COIL

This application is a CIP application copending with U.S. application Ser. No. 316,978, which is now abandoned.

BACKGROUND OF THE INVENTION

This invention relates to the structure of an electromagnetic transducer, in particular, relates to an improved structure of a voice coil motor, which means, in the present specification, a linear motor working according to the principle of a dynamic sound speaker.

A voice coil motor, according to the present invention, may be applied, for instance, to a linear driving motor which positions in a short time movable magnetic heads or flying heads on the desired track of a magnetic medium of a magnetic disc unit in an information processing system such as a computer system. The access time that a central processing unit of a computer system must wait to read or write desired information to or from a magnetic disc unit should be as short as possible, preferably less than 60 mS. And the access time of a magnetic disc unit depends mainly on the positioning time of movable heads. Therefore, the characteristics of a linear driving motor for positioning movable heads affects not only the access time of a magnetic disc unit, but also the performance of the whole computer system.

The linear driving motor for positioning movable heads has been provided with an hydraulic actuator, a printed circuit motor or a pulse motor in which the access time of a magnetic disc unit takes 70 – 80 mS on the average. However, this access time is so long for a high speed computer system that various kinds of motors which provide shorter access time have been proposed and developed. One of the motors which has been developed for positioning movable heads is a voice coil motor which works on the principle of a dynamic sound speaker.

One disadvantage of the prior voice coil motor is that flux density in a magnetic pole gap of a voice coil motor is insufficient to obtain enough force or torque for positioning movable heads in a short time. Another disadvantage of the prior voice coil motor is that the inductance of a moving coil is too large and, therefore, high speed positioning and stable control of movable heads are not obtained.

In order to overcome the above disadvantages, a voice coil motor has been developed which has a cylindrical smooth magnetic pole inscribed on a ferrite magnet. Although this motor overcomes a part of the above disadvantages, additional improvement is still necessary.

Scarrott disclosed an improved motor by providing a laminated magnetic pole on a smooth magnetic pole in U.S. Pat. No. 3,694,678. However, Scarrott's motor has only a small effect for reducing the inductance of a moving coil, since the laminated magnetic pole is not directly connected to a permanent magnet, but a smooth magnetic pole is provided between the lamination and the permanent magnet. The magnetic pole must be completely laminated or toothed, otherwise the magnetic flux goes through the untoothed portion of the magnetic pole and the inductance can not be decreased very much since the material of the magnetic pole has considerably large permiability $\mu$. However, due to the special structure of Scarrott's motor, the magnetic pole can not be completely toothed.

SUMMARY OF THE INVENTION

An object of the present invention is to provide a voice coil motor which overcomes the above-mentioned drawbacks.

Another object of the present invention is to provide a voice coil motor which has high flux density in a magnetic pole gap.

A further object of the present invention is to provide a voice coil motor in which inductance of a moving coil is small.

A still further object of the present invention is to provide a voice coil motor which positions movable heads of a magnetic disc unit in a short time.

A still further object of the present invention is to provide a voice coil motor in which magnetic flux in the gap is in uniform strength, and thus the torque of the motor is independent on the position of the moving coil.

The above objects are attained by an improved voice coil motor having a yoke with a bottom plate, side wall and a center core made of ferromagnetic material; a permanent magnet made of ferrite material magnetized in direction through said side wall and a center core, and inscribed on the internal surface of said yoke; a gap space between said center core and permanent magnet, and a moving coil movably positioned in said gap; a magnetic pole inscribed on the internal surface of said magnet, said magnetic pole comprising at least a plurality of plates of ferromagnetic material connected directly to the internal surface of said magnet.

According to one feature of the present invention, said magnetic pole comprises a plurality of ferromagnetic rings not magnetically connected to one another.

According to another feature of the present invention, a plurality of second rings made of non-magnetic but conductive material are placed between said ferromagnetic rings.

BRIEF EXPLANATION OF THE DRAWINGS

Further features and advantages of the present invention will be apparent from the ensuing description with reference to the accompanying drawings to which, however, the scope of the invention is in no way limited.

DETAILED EXPLANATION OF THE PREFERRED EMBODIMENTS

Figure 1:
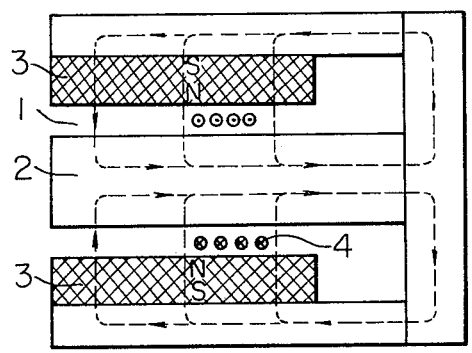
FIG. 1(A) and FIG. 1(B) are sectional views of two kinds of voice coil motors of prior art.
Figure 1:
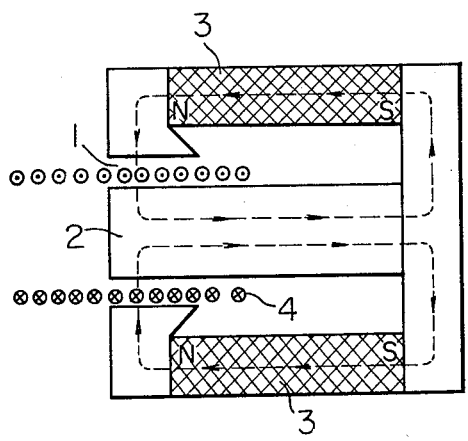

Two kinds of voice coil motors as shown in FIG. 1(A) and FIG. 1(B) have been known. In these figures reference number 1 is a magnetic pole gap, 2 is a magnetic core, 3 is a cylindrical permanent magnet and 4 is a moving coil, which is able to move along the magnetic pole gap 1. In FIG. 1(A), the length of a moving coil 4 is shorter than the width of a cylindrical permanent magnet 3, which is magnetized in its diameter direction, and the magnetic flux flow is shown in dotted line. While in FIG. 1(B), the length of a moving coil 4 is longer than that of the magnetic pole of a core 2 connected to a cylindrical permanent magnet 3, which is magnetized in longitudinal direction, and the magnetic flux is shown in dotted line.

Figure 2A:
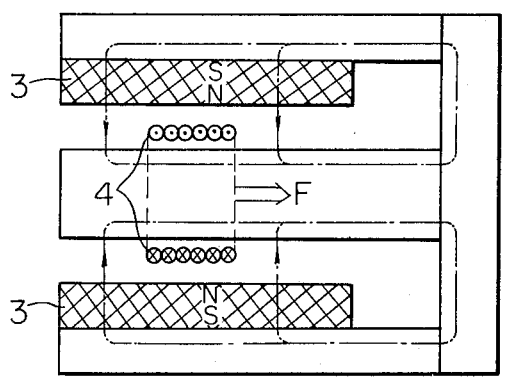
FIG. 2(A) and FIG. 2(B) are sectional views of a prior voice coil motor showing operational principles.
Figure 2B:
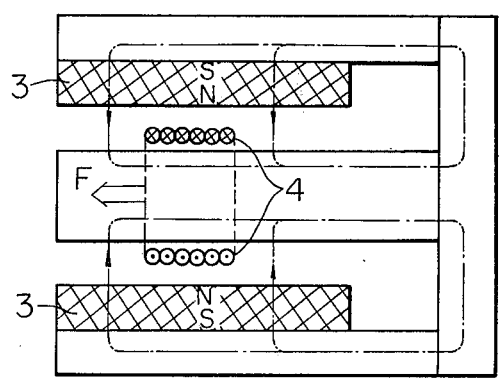

The operational principle of both types of voice coil motors relates to Fleming's lefthand rule, which, on the condition that the thumb, index and middle fingers of a left hand are placed perpendicular one another, a force F in the thumb direction is applied to a current flowing in the middle finger direction if the magnetic field around said current is in the index finger direction. The strength of said force F depends upon an amount of current, magnetic flux density and the length of a coil which interlinks with flux. Said force F is utilized for linear driving of movable heads. According to the effect of said left-hand rule, a coil 4, in FIG. 2(A) or FIG. 2(B), is forced to move right (FIG. 2(A)), or left (FIG. 2(B)), along the magnetic pole gap according to the direction of current in the coil 4.

A voice coil motor according to the present invention relates, in particular, to that of FIG. 1(A).

In a voice coil motor of FIG. 1(A), the higher access time is obtained by the higher magnetic flux density in the magnetic pole gap. The magnetic flux interlinks with a current in a coil 4 movably mounted in the magnetic pole gap. A casting magnet which is known to have a high saturation level of flux density may be able to provide a permanent magnet 3 with high flux density. However, the coercive force of the casting magnet is so small that the operational point of a magnet has to change according to the magnitude and direction of a current in the coil, resulting in the change of magnitude of force provided in the coil. This property of a casting magnet sometimes makes it difficult to control the position and speed of a moving coil of a voice coil motor.

One proposal which overcomes the disadvantage of said casting magnet is a ferrite magnet, in particular, a barium-ferrite magnet, which has large coercive force.

Figure 3A:
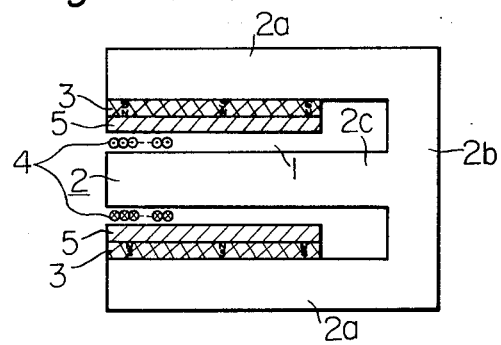
FIG. 3(A), FIG. 3(B) and FIG. 3(C) are sectional views of a prior voice coil motor showing the difference of inductance depending on the position of a moving coil.
Figure 3B:
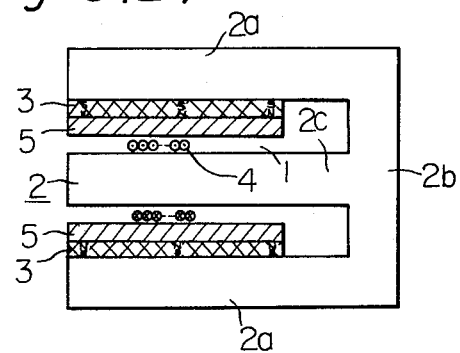
Figure 3C:
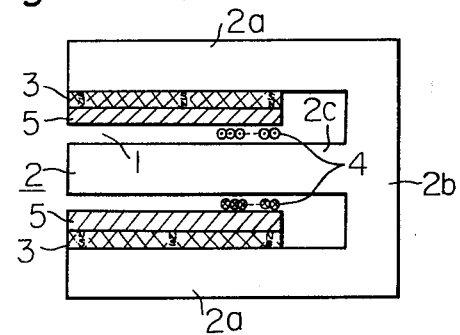

FIG. 3(A) – FIG. 3(C) show sectional views of a voice coil motor with a ferrite magent. In FIG. 3(A) – FIG. 3(C), a magnetic core 2 has a cylindrical part 2a, flat bottom 2a and center core 2c. A cylindrical ferrite magnet 3 is concentric with the cylindrical part 2a of a core 2, and the external surface of the magnet 3 is inscribed with an internal surface of the cylindrical part 2a. Further a cylindrical magnet pole 5, made of ferromagnetic material is concentric with a magnet 3, and the external surface of the pole 5 is inscribed on an internal surface of the magnet 3. A cylindrical magnetic pole gap 1 is provided between a magnetic pole 5 and a center core 2c, and a coil 4 movable along the gap 1 is provided. In FIG. 3(A) – FIG. 3(C), flux density in magnetic pole gap 1 is large due to the presence of cylindrical magnetic pole 5, because magnetic flux which diverges from a wide surface of magnet 3 gathers to the small internal surface of a magnetic pole 5.

However, a voice coil motor of FIG. 3(A) – FIG. 3(C), which has only an ordinary smooth magnetic pole is still unsatisfactory for a linear driving motor of movable heads, because a moving coil of the voice coil motor of FIG. 3(A) FIG. 3(C) has a large amount of inductance, which affects the operation speed of the same. That is to say, when a moving coil moves linearly along an axis of a magnetic pole gap, a magnetic flux which has no concern of linear movement of a moving coil is induced around the same moving coil because of a current in the moving coil. A magnetic reluctance along a magnetic path of a moving coil with a magnetic pole is smaller than that with no magnetic pole, because a magnetic pole of ferromagnetic material is inserted in a part of the magnetic path instead of just in empty space. That is to say, the magnetic pole induces flux density and reduces magnetic reluctance, which induces inductance of a moving coil as shown in the following formula.

$$L = k_1 \phi = k_2 \frac{n^2}{R}$$

where $L$ is inductance, $n$ is number of turns of a coil, $\phi$ is flux, $R$ is magnetic reluctance, $k_1$ and $k_2$ are constant. Further, said magnetic reluctance and inductance change according to the position of a moving coil shown in FIG. 3(A) – FIG. 3(C). In the other words, the inductance of FIG. 3(A), FIG. 3(B) and FIG. 3(C) differs because of the different position of a moving coil. In this case, control of speed and position of a moving coil is rather difficult, and it takes a long time to control the same. Therefore a voice coil motor with just an ordinary smooth magnetic pole is not capable of providing high speed operation of movable heads of a magnetic disc unit.

Figure 4:
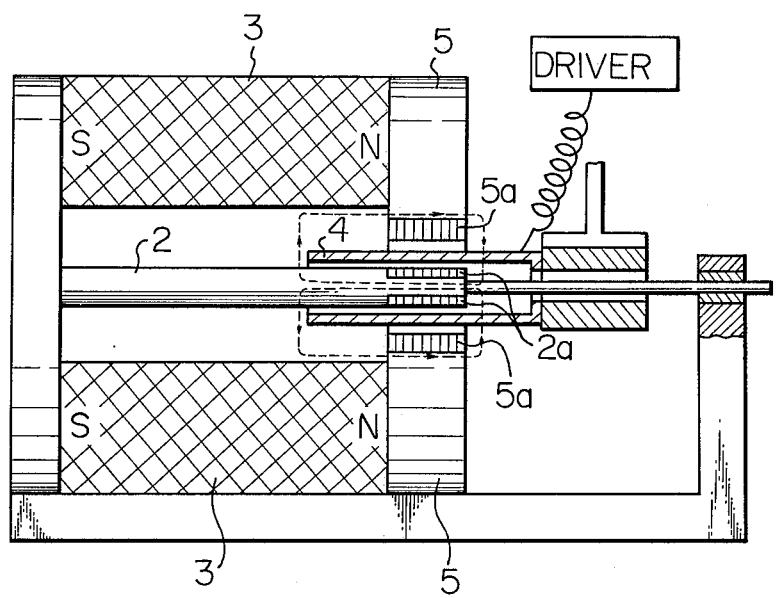
FIG. 4 is another structure of a prior voice coil motor.

U.S. Pat. No. 3,694,678, by Scarrott, disclosed a voice coil motor shown in FIG. 4. This motor is substantially the same as that in FIG. 1(B), except that slit type or comb-tooth type magnetic poles 5a and 2a are provided. The toothed magnetic pole prevents the magnetic flux induced by the moving coil 4 and, thus decreases the inductance of the moving coil 4. However, the magnetic poles in Scarrott must have a large untoothed portion 5 and 2 and, since the magnetic flux of the moving coil 4 passes through said untoothed portion of the magnetic pole 5 and 2 as indicated by dotted line, the effect for reducing the inductance of the moving coil is not sufficient and must be further improved.

Accordingly, the present invention is designed to provide an improved voice coil motor with high magnetic density and small inductance, and to provide small access time of movable heads of a magnetic disc unit.

Figure 5A:
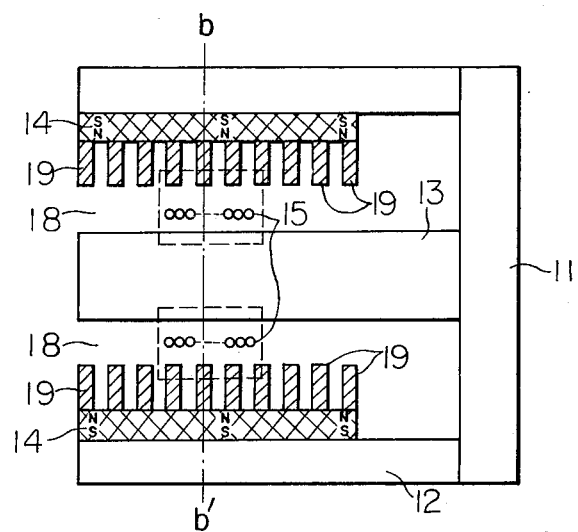
FIG. 5(A) is a sectional view of the other embodiment of a voice coil motor according to the present invention.
Figure 5B:
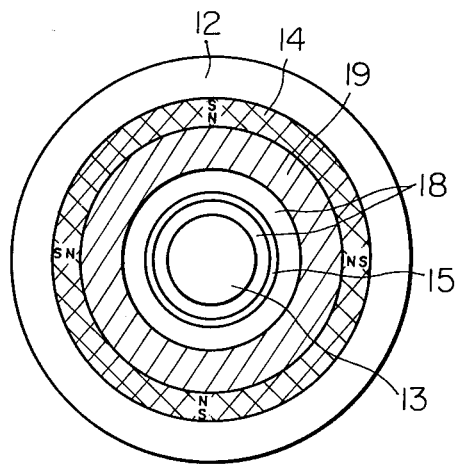
FIG. 5(B) is a sectional view at line b-b' of FIG. 5(A)

FIG. 5(A) shows a sectional view of an embodiment of a voice coil motor according to the present invention. FIG. 5(B) shows a sectional view at line b–b' of FIG. 5(A), and FIG. 5(C) shows a fragmentary perspective view of a voice coil motor shown in FIG. 5(A) and FIG. 5(B).

Figure 5C:
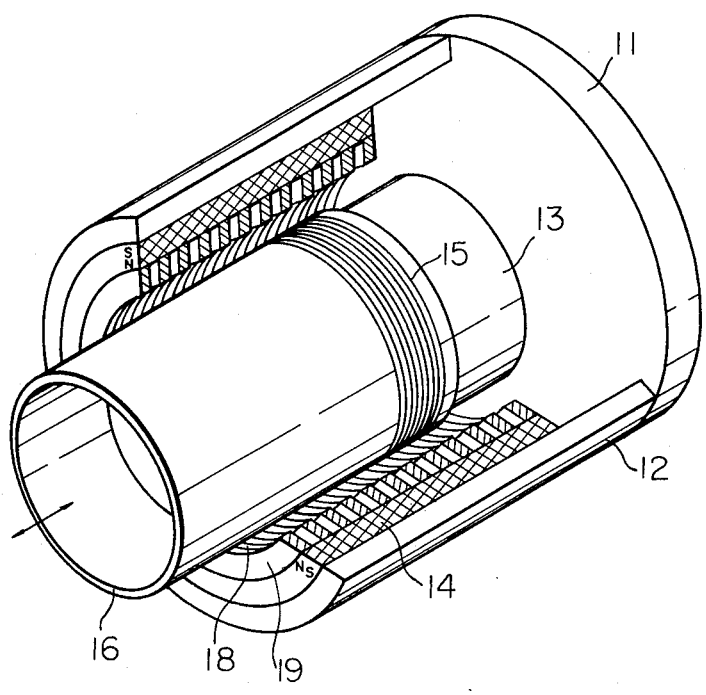
FIG. 5(C) is a fragmentary perspective view of FIG. 5(A)

In FIG. 5(A) – FIG. 5(C) a voice coil motor according to the present invention has a flat bottom yoke 11 made of ferromagnetic material. An external hollow cylindrical yoke 12, made of ferromagnetic material, is connected perpendicular to the yoke 11. A hollow cylindrical permanent magnet 14 made of ferrite material is inscribed in an external yoke 12. A plurality of ferromagnetic rings 19 are inscribed on the internal surface of a permanent magnet 14, spaced a predetermined length from one another along central axis of said magnet 14. Therefore, rings 19 are not magnetically connected to one another, and said rings 19 form and work as a magnetic pole. A center core 13 shaped as a right circular cylinder is made of ferromagnetic material and is provided at the center of the yoke 11, con entric to an external yoke 12. A cylindrical space between the center core 13 and rings 19 provides gap 18, in which a moving coil 15 wound on a bobbin 16 is movably placed. The moving coil 15 together with the bobbin 16 moves in gap 18 linearly along the center core 13, as shown by an arrow in FIG. 5(C). The direction of magnetic flux of a permanent magnet 14 is in the diameter direction of the same. A voice coil motor of FIG. 5(A) – FIG. 5(C) has a magnetic path for the magnetic flux of magnet 14, from the N pole of permanent magnet 14 through rings 19, a gap 18, a center core 13, a yoke 11 and an external yoke 12 to the S pole of permanent magnet 14. A uniform magnetic field is, therefore, provided in a gap 18. Permanent magnet 14 is made of Barium-ferrite or strontium-ferrite material which has large coercive force and a comparatively high saturation level of flux density. A magnetic path of magnetic flux induced around the coil 15 by current goes through a center core 13, a gap 18, a plurality of rings 19, a gap 18 and a center core 13 as shown by the dotted line in FIG. 5(A). Said magnetic path hardly enters into the permanent magnet 14, in which permeability $\mu$ is considerably small. Therefore, a considerably large amount of magnetic flux must go through gaps between rings 19, which induces the magnetic reluctance and thus reduces inductance of the coil 15. It should be understood that unlike the partially toothed magnetic pole of FIG. 4, which is magnetically continuous for the magnetic flux of the coil, the main point of the embodiment of FIG. 5(A) – FIG. 5(C) is that rings 19 are magnetically separated from one another. Accordingly a voice coil motor of FIG. 5(A) – FIG. 5(C) provides more magnetic reluctance and less inductance than that of FIG. 4.

Figure 6A:
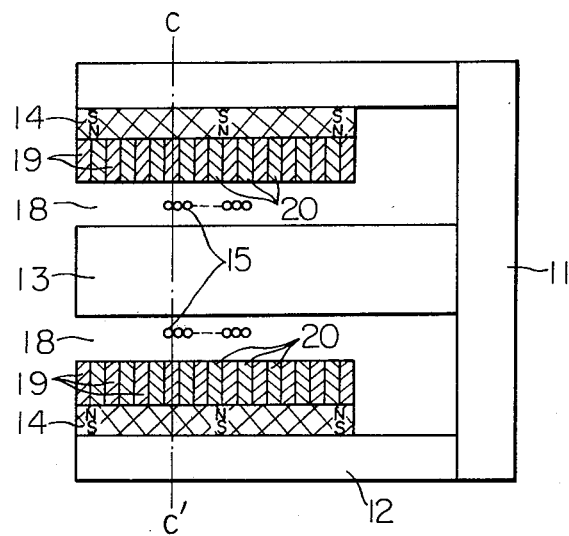
FIG. 6(A) is a sectional view of another embodiment of a voice coil motor according to the present invention.
Figure 6B:
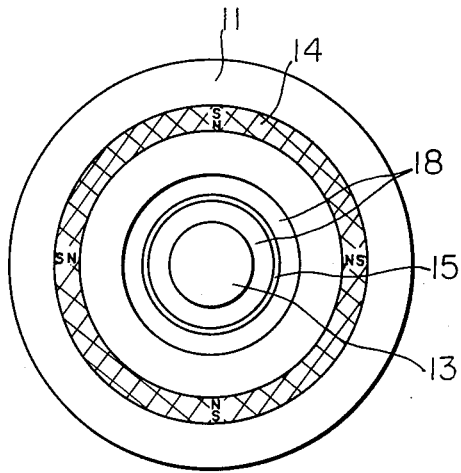
FIG. 6(B) is a sectional view at line c-c' of FIG. 6(A)

FIG. 6(A) shows a sectional view of another embodiment of a voice coil motor according to the present invention, and FIG. 6(B) shows a sectional view at line c–c' of FIG. 6(A). The structure of a voice coil motor of FIG. 6(A) and FIG. 6(B) is the same as that of FIG. 5(A) – FIG. 5(C), except that the former has a plurality of second rings 20. The external and internal diameters of second rings 20 are the same as those of first rings 19. The rings 20 are placed between the first rings 19. Both rings 19 and 20 are laminated in one body, inscribed on the internal surface of a magnet 14, and provide a cylindrical magnetic pole. Second rings 20 are made of nonmagnetic material such as copper which has low resistivity. A voice coil motor of FIG. 6(A) and FIG. 6(B) improves of a voice coil motor of FIG. 5(A) – FIG. 5(C) and provides shorter access time of movable heads due to the eddy current on the surface of second rings 20.

Figure 7:
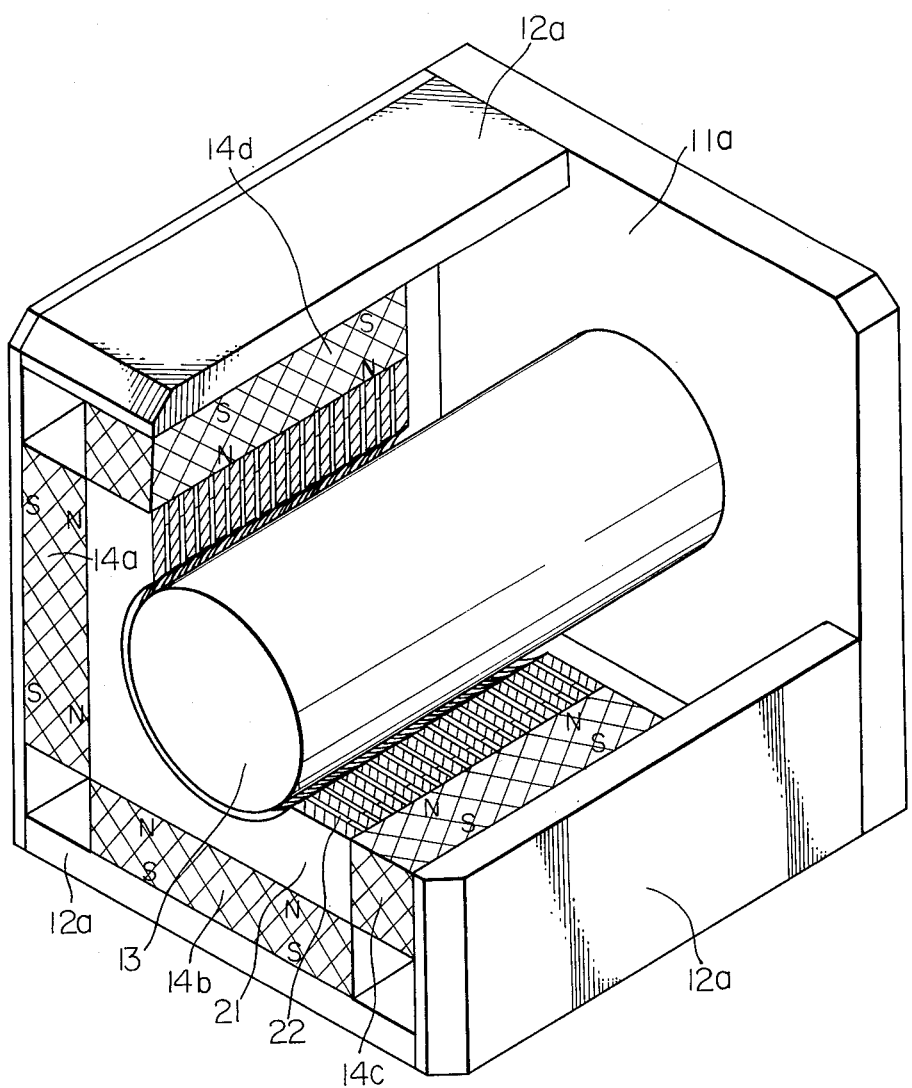
FIG. 7 is a fragmentary perspective view of another embodiment of a voice coil motor according to the present invention.

FIG. 7 shows a fragmentary perspective view of another embodiment of a voice coil motor according to the present invention. In FIG. 7, 11a is a yoke, 12a is an external yoke, 13 is a center core, 14a – 14d are permanent magnets which are magnetized in thickness direction, 21 is a magnetic pole comprising a plurality of ferromagnetic plates whose outward form is square and which are inscribed on the internal surface of the permanent magnets 14a – 14d. Non magnetic plate 22 is provided in each slit between said ferromagnetic plates. A coil and a bobbin are not shown in FIG. 7. The structure and operation of a voice coil motor of FIG. 7 are the same as that of FIG. 6(A) and FIG. 6(B) except that the outward form of FIG. 7 is square.

Figure 8:
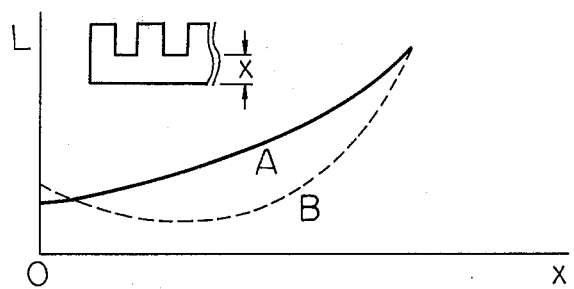
FIG. 8 is a curve showing an effect of the toothed magnetic pole.

FIG. 8 is an experimental curve showing the effect of the toothed magnetic pole, in which the curve (A) concerns a toothed magnetic pole of FIG. 5(A) – FIG. 5(C) which has only air between each of the teeth or plates, and the curve (B) concerns a toothed magnetic pole of FIG. 6 or FIG. 7 which has non-magnetic material like copper between each of the teeth or plates. The horizontal axis $x$ shows the depth of the un-toothed portion of the magnetic pole as shown in FIG. 8, and the vertical axis L shows the magnitude of inductance of the coil 15. As is apparent from FIG. 8 the inductance of the coil 15 is almost the minimum when $x$ is zero. That is the reason why the present invention in FIGS. 5(A) – 5(C), 6(A) – 6(B) and 7 utilizes the completely toothed magnetic pole instead of a partially toothed magnetic pole like that in FIG. 4. The result of our experiment teaches that a partially toothed magnetic pole is not as effective for reducing the inductance of the coil as a completely toothed magnetic pole. The theoretical reason for this is, since the permiability $\mu$ of the material of the magnetic pole is larger than that of the magnet, the magnetic flux can go through the un-toothed portion of the magnetic pole if the magnetic pole is toothed only partially.

Figure 9:
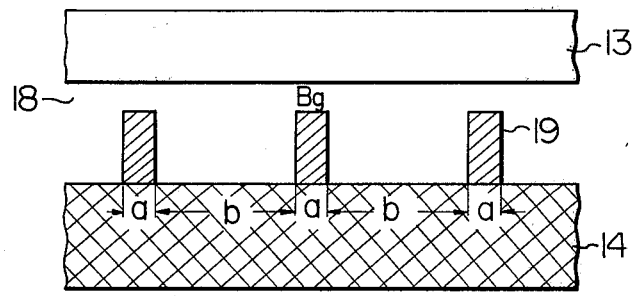
FIG. 9 is an enlarged structure of a toothed magnetic pole.
Figure 10:
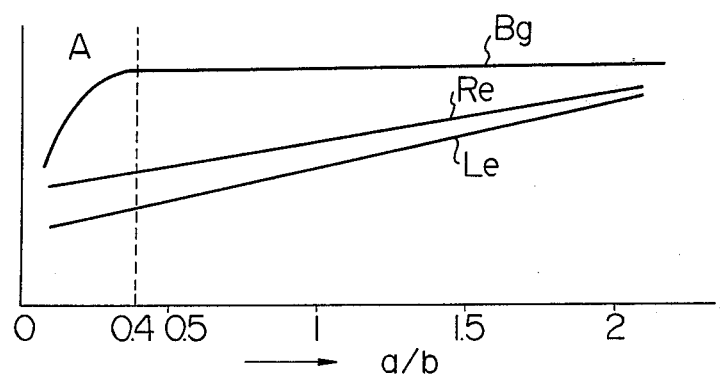
FIG. 10 is a curve showing the relationship between the thickness of the tooth and the characteristics of the motor.

Next, the best structure of the magnetic pole, that is, the optimum ratio of the thickness ($a$) of each tooth to the length ($b$) between each of the teeth is explained with respect to FIG. 9 and FIG. 10. In FIG. 9, the reference numbers indicate the same portions as in FIG. 5(A). In FIG. 9, it is considered that the toothed magnetic pole provides not only the reduction of the inductance of the coil, but also the flux density Bg by the magnet in the gap 18. The large flux density Bg is, of course desirable for the operation of the motor as is the small inductance. Accordingly, we must select the best value $a/b$, which satisfies both the desirable flux density Bg and inductance of the coil 15. FIG. 10 shows curves by experimentation, in which the horizontal axis is the ratio $a/b$, and the vertical axis is the magnitude of the flux density Bg, and the resistance Re and the inductance Le of the impedance Ze of the coil 15. The impedance Ze of the coil 15 is expressed $$Ze = Re + jLe.$$

In FIG. 10, it should be noticed that the flux density Bg is decreased suddenly when the ratio $a/b$ is less than 0.4, and when the ratio $a/b$ is larger than 0.4, the flux density Bg is almost constant and the values of Re and Le are increased linearly. Further, when the ratio $a/b$ is larger than 10, the inductance Le of the coil disturbs the high speed and stable operation of the motor. Accordingly our conclusion is that the range of the ratio $a/b$ should be from 0.4 to 1.0.

Further, the sum of ($a$) and ($b$), must be far smaller than the longitudinal length C of the moving coil 15, in order to provide the constant torque regardless the axial position of the coil. Our experiment shows that the sum ($a + b$) is preferably smaller than $C/4$ ($a + b \leq C/4$), which means that there are at least four teeth 19 within the length C of the coil 15. According to that condition, the example of the numerical design is;

$a = 2$ mm
$b = 5$ mm
$C = 65$ mm
$a/b = 0.4$
$C/(a + b) = 9.3$

Figure 11:
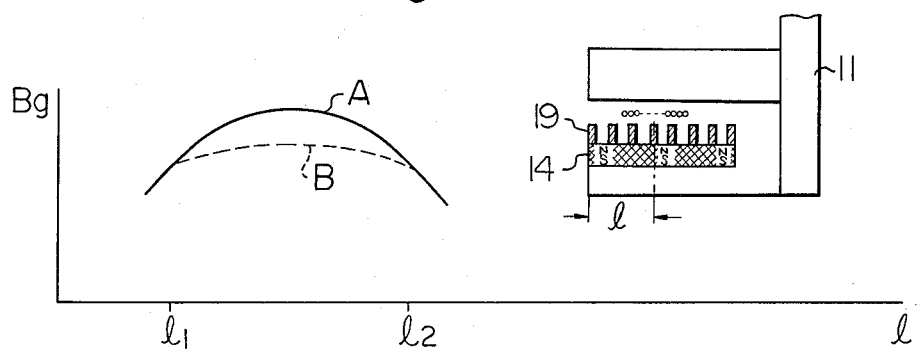
FIG. 11 is a curve showing the strength of magnetic flux in a magnetic pole gap.
Figure 12:
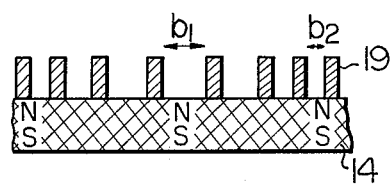
FIG. 12 is an improved structure of a toothed magnetic pole.
Figure 13:
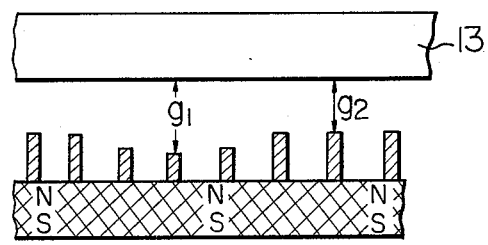
FIG. 13 is another improved structure of a toothed magnetic pole.

Now, the distribution of the flux density Bg of the magnetic flux in the gap is explained with FIGS. 11 through 13. The curve (A) in FIG. 11 shows the conventional relationship between the axial position $l$ in the gap space and the flux density Bg at that position. The curve (A) shows that the magnetic flux Bg is not flat but is large at the middle point in the gap space. However, the flat curve like the curve (B) in FIG. 11 is preferable for the operation of the motor. When the curve is flat, the motor can provide the constant torque regardless the position of the moving coil. In order to obtain the flat curve, the magnetic flux at the middle point in the gap must be reduced. For that purpose, we disclose the two embodiments of the magnetic pole shown in FIG. 12 and FIG. 13. In FIG. 12 the length $b1$ between each of the teeth 19 at the middle point of the gap is larger than the length $b2$ between each of the teeth 19 at the ends of the gap. On the other hand, in FIG. 13, the tooth at the middle point of the gap is shorter than those at the ends of the gap, that is to say, the gap width $g1$ at the middle point of the gap is larger than the gap width $g2$ at the ends of the gap. It should be understood, of course, that the magnetic pole of FIG. 12 or FIG. 13 provides the smaller magnetic flux at the middle point of its gap than the prior magnetic pole does, and the distribution of the magnetic flux becomes flat.

As mentioned above, a voice coil motor according to the present invention provides high flux density and low inductance due to the particular structure of a magnetic pole. Thus the shorter access time of movable heads of a magnetic disc unit is obtained.

In conclusion, some particular features of a voice coil motor according to the present invention are enumerated.

a. The magnetic flux density in gap 18 depends on the ratio of the internal diameter of permanent magnet 14 to the internal diameter of cylinder 17 or rings 19. This ratio is more than 1. Therefore, high magnetic flux density in gap 18 is obtained even if residual flux of the permanent magnet 14 is small.

b. A particular structure of magnetic pole, which has a plurality of slits at the internal surface or a plurality of rings not magnetically connected to one another, provides more magnetic reluctance, which decreases the equivalent permeability $\mu$, inductance of a movong coil and fluctuation of the inductance according to the position of a moving coil.

c. Residual magnetic flux density of a permanent magnet may be small in the present voice coil motor, and such magnetic material generally has large coercive force. Therefore, the thickness of the hollow cylindrical permanent magnet may be small, and accordingly, a voice coil motor of small size and light weight may be obtained.

d. The slits of cylinder 17 or magnetic ring 19 also work like the fins of a radiator. Accordingly the cooling of the voice coil motor may be improved and a voice coil motor of small size and high torque may be obtained.

e. The constant torque of the motor is obtained regardless the axial position of the moving coil.

From the foregoing it will be apparent that a new and improved voice coil motor has been found. It should be understood, of course, that the embodiments disclosed are merely illustrative and are not intended to limit the scope of the invention.

What we claim is:

1. A voice coil motor having a yoke with a bottom plate, side wall and a center core made of ferromagnetic material, a permanent magnet made of ferrite material magnetized in direction through said side wall and a center core, and inscribed on the internal surface of said yoke, a gap space between said center core and permanent magnet, and a moving coil movably positioned in said gap space, which is characterized in further comprising a magnetic pole inscribed directly on the internal surface of said magnet, said magnetic pole comprising a plurality of magnetically disconnected plates of ferromagnetic material with a center circular hole, the ratio of the thickness of each said plate to the length between said plates is in the range from 0.4 to 1.0.

2. A voice coil motor according to claim 1, wherein the outward form of said yoke is square.

3. A voice coil motor according to claim 1, wherein the outward form of said yoke is circular.

4. A voice coil motor according to claim 1, further comprising a plurality of second plates made of nonmagnetic material with a center circular hole placed between said ferromagnetic plates.

5. A voice coil motor according to claim 1, wherein the width of the gap space at the middle point along the axis of said gap space is larger than that at the end points along said axis of said gap space.

6. A voice coil motor having a yoke with a bottom plate, side wall and a center core made of ferromagnetic material, a permanent magnet made of ferrite material magnetized in direction through said side wall and a center core, and inscribed on the internal surface of said yoke, a gap space between said center core and permanent magnet, and a moving coil movably positioned in said gap space, which is characterized in further comprising a magnetic pole inscribed directly on the internal surface of said magnet, said magnetic pole comprising a plurality of magnetically disconnected plates of ferromagnetic material with a center circular hole, the width of said gap space at the middle point along the axis of said gap space is larger than that at the end points along said axis of said gap space.

* * * * *